(12) United States Patent
Kim et al.

(10) Patent No.: US 9,272,902 B2
(45) Date of Patent: Mar. 1, 2016

(54) RESISTANCE HEATING COMPOSITION, HEATING COMPOSITE USING THE COMPOSITION, METHOD OF PREPARING THE HEATING COMPOSITE, AND HEATING APPARATUS AND FUSING APPARATUS USING THE SAME

(75) Inventors: Dong-ouk Kim, Pyeongtaek-si (KR); Dong-earn Kim, Seoul (KR); Ha-jin Kim, Hwaseong-si (KR); Sung-hoon Park, Seoul (KR); Min-jong Bae, Yongin-si (KR); Yoon-chul Son, Hwaseong-si (KR); Sang-eui Lee, Hwaseong-si (KR); Kun-mo Chu, Seoul (KR); In-taek Han, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 295 days.

(21) Appl. No.: 13/565,510

(22) Filed: Aug. 2, 2012

(65) Prior Publication Data

US 2013/0222510 A1 Aug. 29, 2013

(30) Foreign Application Priority Data

Feb. 24, 2012 (KR) ........................ 10-2012-0019166

(51) Int. Cl.
| | |
|---|---|
| *B82Y 30/00* | (2011.01) |
| *G03G 13/20* | (2006.01) |
| *G03G 15/20* | (2006.01) |
| *B41J 2/435* | (2006.01) |
| *H01B 1/24* | (2006.01) |

(Continued)

(52) U.S. Cl.
CPC ................. *B82Y 30/00* (2013.01); *B41J 2/435* (2013.01); *G03G 13/20* (2013.01); *G03G 15/206* (2013.01); *H01B 1/24* (2013.01); *H05B 3/14* (2013.01); *H05B 3/26* (2013.01); *G03G 2215/2054* (2013.01); *H05B 2214/04* (2013.01)

(58) Field of Classification Search
CPC . B41J 2/385; G03G 15/2057; G03G 15/2053; G03G 2215/2048; G03G 15/2014; G03G 15/20; G03G 15/2064; B05D 5/12
USPC ........... 347/156; 399/331, 333, 338; 427/122; 977/723, 932
See application file for complete search history.

(56) References Cited

U.S. PATENT DOCUMENTS

| | | | | |
|---|---|---|---|---|
| 4,962,165 | A | * | 10/1990 | Bortnick et al. .............. 525/479 |
| 5,085,803 | A | * | 2/1992 | Wakita et al. ................. 252/511 |
| 5,162,429 | A | * | 11/1992 | Burns et al. ................... 524/790 |

(Continued)

FOREIGN PATENT DOCUMENTS

| | | |
|---|---|---|
| JP | 2007-154100 A | 6/2007 |
| KR | 1020060108787 A | 10/2006 |

(Continued)

OTHER PUBLICATIONS

Sinani et al., Aqueous Dispersion of Single-wall and Multiwall Carbon nanotubes with Designed Amphiphilic Polycations 2005, J. Am. Chem. Soc., vol. 127, pp. 3463-3472.*

*Primary Examiner* — Kristal Feggins
*Assistant Examiner* — Kendrick Liu
(74) *Attorney, Agent, or Firm* — Harness, Dickey & Pierce, P.L.C.

(57) ABSTRACT

A resistance heating composition including a silicon emulsion particle, a carbon nanotube, and an aqueous medium.

28 Claims, 5 Drawing Sheets

POSITIVELY CHARGED CARBON NANOTUBE    ANIONIC SURFACTANT TREATED SILICONE EMULSION PARTICLE (51) Int. Cl.
*H05B 3/14* (2006.01)
*H05B 3/26* (2006.01)

(56) References Cited

U.S. PATENT DOCUMENTS

| | | | |
|---|---|---|---|
| 2004/0028859 A1* | 2/2004 | LeGrande et al. | 428/36.91 |
| 2007/0196749 A1* | 8/2007 | Inaba et al. | 430/58.2 |
| 2008/0107450 A1* | 5/2008 | Watanabe et al. | 399/175 |
| 2008/0286559 A1* | 11/2008 | Lee et al. | 428/323 |
| 2009/0200517 A1* | 8/2009 | El Bounia | 252/500 |
| 2010/0143833 A1* | 6/2010 | Baba et al. | 430/106.2 |
| 2010/0189943 A1* | 7/2010 | Qi et al. | 428/36.4 |
| 2010/0209154 A1* | 8/2010 | Kim et al. | 399/333 |
| 2010/0221531 A1* | 9/2010 | Oh et al. | 428/338 |
| 2010/0286327 A1* | 11/2010 | Moorlag et al. | 524/496 |
| 2011/0048277 A1* | 3/2011 | Sivarajan et al. | 106/31.13 |
| 2011/0171471 A1* | 7/2011 | Liles | 428/405 |
| 2012/0070208 A1* | 3/2012 | Qi et al. | 399/333 |
| 2012/0095143 A1* | 4/2012 | Sue et al. | 524/284 |
| 2012/0145431 A1* | 6/2012 | Jeong et al. | 174/110 R |
| 2012/0193568 A1* | 8/2012 | Liu et al. | 252/62.9 R |

FOREIGN PATENT DOCUMENTS

| | | |
|---|---|---|
| KR | 1020080056983 A | 6/2008 |
| KR | 10-2010-0015742 | 2/2010 |
| KR | 1020100017500 A | 2/2010 |

* cited by examiner

FIG. 1

POSITIVELY CHARGED   ANIONIC SURFACTANT TREATED
CARBON NANOTUBE      SILICONE EMULSION PARTICLE

RESISTANCE HEATING COMPOSITION, HEATING COMPOSITE USING THE COMPOSITION, METHOD OF PREPARING THE HEATING COMPOSITE, AND HEATING APPARATUS AND FUSING APPARATUS USING THE SAME

CROSS-REFERENCE TO RELATED APPLICATIONS

This application claims the benefit of Korean Patent Application No. 10-2012-0019166, filed on Feb. 24, 2012, and all the benefits accruing therefrom under 35 U.S.C. §119, the content of which in its entirety is incorporated herein by reference.

BACKGROUND

1. Field

The present disclosure relates to a resistance heating composition, a heating composite using the same, a method of preparing the heating composite, and a heating apparatus and a fusing apparatus that include the heating composite.

2. Description of the Related Art

Printing apparatuses such as a laser printer, a photocopier, or the like, that print images by transferring fine solid toner particles onto paper, using a process other than ink jetting, print and display a desired image through a series of relatively complicated printing processes, including charging, exposing, developing, transferring, and fusing processes.

In printing, a fusing process is a process of fusing toner particles transferred onto paper by electrostatic attraction by applying heat and pressure thereto. Generally, the fusing process is performed by a fusing apparatus including a pair of opposite rollers, such as, a pressure roller and a heating roller.

To be used in a fusing apparatus, a resistance heating composite requires high electrical conductivity. However, in preparing a highly electrically conductive resistance heating composite, when an amount of a conductive filler such as carbon nanotubes is increased, a composition including the same may have markedly increased viscosity. Furthermore, a relative amount of silicon rubber, which is normally mixed with an inorganic additive in a constant ratio, is reduced, which may increase the difficulty of shaping the composition in a specific shape. Therefore, there is a need for a resistance heating composition with a high content of an electrically conductive filler and low viscosity, and that further may be readily shaped.

SUMMARY

Provided is a resistance heating composition with a low viscosity that may be shaped and provides a high electric conductivity.

Provided is a heating composite using the resistance heating composition.

Provided is a method of preparing a heating composite using the resistance heating composition.

Provided is a heating apparatus for a fusing apparatus that uses the heating composite.

Provided is a fusing apparatus for a printing apparatus that uses the heating apparatus.

According to an aspect, a resistance heating composition including a silicone emulsion particle, a carbon nanotube, and an aqueous medium is provided.

The silicone emulsion particle may be surface-treated with a silicone emulsifying surfactant including a cationic surfactant, an anionic surfactant, a nonionic surfactant, an amphoteric surfactant, or a combination thereof.

The carbon nanotube may be surface-treated to have a charge opposite to a charge of the silicone emulsion particle. In an embodiment, the carbon nanotube may be surface-treated with a surfactant for dispersing carbon nanotubes including a cationic surfactant, an anionic surfactant, a nonionic surfactant, an amphoteric surfactant, or a combination thereof.

The carbon nanotube may be surface-treated with a surfactant for dispersing carbon nanotubes, then with a polyelectrolyte having an opposite charge to the surfactant for dispersing carbon nanotubes. The surfactant for dispersing carbon nanotubes may be an anionic surfactant for dispersing carbon nanotubes, and the polyelectrolyte may be a cationic polyelectrolyte.

The silicone emulsion particle and the carbon nanotube may be in a weight ratio of about 100:0.1 to about 100:100.

The aqueous medium may be water, or a combination of water and an organic solvent that is miscible with water at room temperature. In an embodiment, the amount of the aqueous medium may be about 5 to about 50,000 parts by weight based on 100 parts by weight of the silicone emulsion particle.

According to another embodiment, a heating composite including a product of the above-described resistance heating composition is provided.

The heating composite may be in the form of a sheet.

According to another aspect, a method of preparing a heating composite is provided, the method including: preparing the above-described resistance heating composition; disposing the resistance heating composition on a substrate; and thermally treating the resistance heating composition disposed on the substrate to provide the heating composite.

The preparing of the resistance heating composition may include combining a silicone emulsion and an aqueous dispersion solution including carbon nanotubes and an aqueous medium.

The resistance heating composition may be disposed on the substrate by spraying. The resistance heating composition may be disposed on the substrate by spraying, for example at a spray speed of about 0.1 milliliters per minute (mL/min) to about 500 mL/min, and a spray distance, the distance between the resistance heating composition and the substrate, may be from about 0.01 meters (m) to about 1 m.

The thermal treating may include contacting the substrate with a heat source such as a hot plate. The thermal treating may be performed at a temperature of about room temperature to about 250° C.

According to another embodiment, a heating apparatus for a fusing apparatus including: a heating composite layer including a cured product of the above-described resistance heating composition; and an electrode for supplying electricity to the heating composite layer disposed on the heating composite layer is provided.

The heating apparatus may further include a support for supporting the heating composite layer, wherein the heating composite layer is disposed on the support.

The heating apparatus may further include a releasing layer disposed on an outer surface of the heating composite layer.

According to another embodiment, a fusing apparatus for a printing apparatus including: the above-described heating apparatus; and a pressure member disposed opposite to the heating apparatus is provided.

The printing apparatus may be a laser printer.

BRIEF DESCRIPTION OF THE DRAWINGS

These and/or other aspects, advantages and features will become more apparent and more readily appreciated from the following further description of the embodiments, taken in conjunction with the accompanying drawings in which.

DETAILED DESCRIPTION

This disclosure will be described more fully hereinafter with reference to the accompanying drawings, in which various embodiments are shown, wherein like reference numerals refer to like elements throughout. In this regard, the present embodiments may have different forms and should not be construed as being limited to the descriptions set forth herein. Accordingly, the embodiments are provided so that this disclosure will be thorough and complete, and will fully convey the scope of the invention to those skilled in the art, by referring to the figures, to further explain an embodiment of this disclosure. As used herein, the term "and/or" includes any and all combinations of one or more of the associated listed items. Expressions such as "at least one of," when preceding a list of elements, modify the entire list of elements and do not modify the individual elements of the list.

In the drawings, the thickness of layers, films, panels, regions, etc., are not to scale for clarity.

It will be understood that when an element such as a layer, film, region, or substrate is referred to as being "on" or "disposed on" another element, it can be directly on the other element or intervening elements may also be present. In contrast, when an element is referred to as being "directly on" or "directly disposed on" another element, there are no intervening elements present.

The terminology used herein is for the purpose of describing particular embodiments only and is not intended to be limiting. As used herein, the singular forms "a," "an," and "the" are intended to include the plural forms as well, including "at least one," unless the content clearly indicates otherwise. "Or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning consistent with their meaning in the context of the relevant art and the present disclosure, and will not be interpreted in an idealized or overly formal sense unless expressly so defined herein.

As used herein, when a specific definition is not otherwise provided, the term "substituted" refers to a compound or group one substituted with at least one substituent including a halogen (specifically the halogens —F, —Cl, —Br, or —I), a hydroxyl group, a nitro group, a cyano group, an amino group (—$NH_2$, —$NH(R^{100})$ or —$N(R^{101})(R^{102})$, wherein $R^{100}$, $R^{101}$, and $R^{102}$ are the same or different, and are each independently a C1 to C10 alkyl group), an amidino group, a hydrazino group, a hydrazono group, a carboxyl group, an ester group, a ketone group, a substituted or unsubstituted C1 to C30 alkyl group, a substituted or unsubstituted C3 to C30 alicyclic group, a substituted or unsubstituted C6 to C30 aryl group, a substituted or unsubstituted C2 to C30 alkenyl group, a substituted or unsubstituted C2 to C30 alkynyl group, a substituted or unsubstituted C5 to C30 heteroaryl group, and a substituted or unsubstituted C2 to C30 heterocyclic group instead of at least one hydrogen of a functional group, or two or more of the forgoing substituents are linked to each other to provide a ring, provided that the substituted atom's normal valence is not exceeded.

As used herein, when a specific definition is not otherwise provided, the term "alkyl" "group" refers to a straight or branched chain saturated aliphatic hydrocarbon having the specified number of carbon atoms, for example a C1 to C30 alkyl group, and specifically a C1 to C15 alkyl group, and having a valence of at least one, optionally substituted with one or more substituents where indicated, provided that the valence of the alkyl group is not exceeded.

As used herein, the term "alkyl benzenesulfonic acid" refers to a benzenesulfonic acid, wherein the benzene ring is substituted with an alkyl group as defined herein. Non-limiting examples include a (C6-C20 alkyl)benzenesulfonic acid, wherein the number of carbon atoms refers to the alkyl group.

The term "alkenyl" group refers to a straight or branched chain hydrocarbon that comprises at least one carbon-carbon double bond, having the specified number of carbon atoms, for example a C2 to C30 alkenyl group, and specifically a C2 to C18 alkenyl group, and having a valence of at least one, optionally substituted with one or more substituents where indicated, provided that the valence of the alkenyl group is not exceeded.

The term "alkynyl" group refers to a straight or branched chain, monovalent hydrocarbon group having at least one carbon-carbon triple bond. Non-limiting examples include ethynyl.

The term "alkylene" group refers to a straight or branched chain, saturated, aliphatic hydrocarbon group having the specified number of carbon atoms, for example a C1 to C30 alkylene group, and specifically a C1 to C18 alkylene group, and having a valence of at least two, optionally substituted with one or more substituents where indicated, provided that the valence of the alkyl group is not exceeded.

As used herein, the term "alkoxy" group refers to an alkyl group as defined above, having the specified number of carbon atoms, for example a C1 to C30 alkoxy group, and specifically a C1 to C18 alkoxy group, linked via an oxygen, e.g. alkyl-O—.

As used herein, the term "aliphatic group" refers to a C1 to C30 alkyl group, a C2 to C30 alkenyl group, a C2 to C30 alkynyl group, a C1 to C30 alkylene group, a C2 to C30 alkenylene group, or a C2 to C30 alkynylene group, and specifically a C1 to C15 alkyl group, a C2 to C15 alkenyl group, a C2 to C15 alkynyl group, a C1 to C15 alkylene group, a C2 to C15 alkenylene group, or C2 to C15 alkynylene group.

As used herein, the term "alicyclic group" refers to a C3 to C30 cycloalkyl group, a C3 to C30 cycloalkenyl group, a C3 to C30 cycloalkynyl group, a C3 to C30 cycloalkylene group, a C3 to C30 cycloalkenylene group, or C3 to C30 cycloalkynylene group, and specifically a C3 to C15 cycloalkyl group, a C3 to C15 cycloalkenyl group, a C3 to C15 cycloalkynyl group, a C3 to C15 cycloalkylene group, a C3 to C15 cycloalkenylene group, or C3 to C15 cycloalkynylene group.

As used herein, the term "aromatic group" refers to a C6 to C30 aryl group or C6 to C30 arylene group, and specifically a C6 to C16 aryl group or C6 to C16 arylene group.

As used herein, the term "an amide of an amino sulfonic acid" refers to a product resulting from an amino sulfonic acid and an amine. Examples of an amino sulfonic acid include 4-amino-benzene sulfonic acid. Examples of an amine include an aliphatic amine, acetamide, an aryl amine, or a heteroaryl amine, such as 5-methylisoxazol-3-amine, 2,6-dimethylpyrimidin-4-amine, 5,6-dimethoxypyrimidin-4-amine, or the like.

The term "ester" group refers to a —C(=O)OR group, or —OC(=O)R group wherein R is an aliphatic group as defined below, having the specified number of carbon atoms, for example a C2 to C30 ester group, and specifically a C2 to C18 ester group, wherein the carbon of the carbonyl group is included in the specified number of carbon atoms.

As used herein, the term "sulfonated glyceryl ester of a fatty acid" refers to a product resulting from sulfonation of an unsaturated fatty acid glycerol ester. The unsaturated fatty acid glycerol ester includes monoesters, diesters, and triesters obtained by esterification of glycerol with an unsaturated fatty acid containing six or more carbon atoms, with one or more double bonds. Examples of an unsaturated fatty acid include alpha-linolenic acid, arachidonic acid, docosahexaenoic acid, eicosapentaenoic acid, elaidic acid, erucic acid, linoelaidic acid, linoleic acid, myristoleic acid, oleic acid, palmitoleic acid, petroselic acid (i.e., (Z)-octadec-6-enoic acid), sapienic acid, vaccenic acid, or the like.

As used herein, the term "sulfonated monovalent alcohol ester" refers to a product resulting from sulfonation of an unsaturated monovalent alcohol ester. The unsaturated monovalent alcohol ester includes monoesters obtained by esterification of a saturated monovalent alcohol with an unsaturated fatty acid containing six or more carbon atoms, with one or more double bonds. Examples of a saturated monovalent alcohol include a C2 to C30 alkyl monovalent alcohol, such as ethanol, propanol, butanol, pentanol, hexanol, heptanol, octanol, or the like. Examples of an unsaturated fatty acid include those defined herein.

The term "cycloalkyl" group refers to a group that comprises one or more saturated and/or partially saturated rings in which all ring members are carbon, such as cyclopropyl, cyclobutyl, cyclopentyl, cyclohexyl, cycloheptyl, cyclooctyl, adamantyl and partially saturated variants of the foregoing, such as cycloalkenyl groups (e.g., cyclohexenyl) or cycloalkynyl groups, and having a valence of at least one, and optionally substituted with one or more substituents where indicated, provided that the valence of the alkyl group is not exceeded. Cycloalkyl groups do not include an aromatic ring or a heterocyclic ring. When the numbers of carbon atoms is specified, for example a C3 to C30 cycloalkyl group, and specifically a C3 to C18 cycloalkyl group, wherein the number means the number of ring members present in the one or more rings.

The term "cycloalkenyl" group refers to a stable monovalent aliphatic monocyclic or polycyclic group having at least one carbon-carbon double bond, wherein all ring members are carbon. Non-limiting examples include cyclopentenyl and cyclohexenyl.

The term "cycloalkynyl" group refers to a stable aliphatic monocyclic or polycyclic group having at least one carbon-carbon triple bond, wherein all ring members are carbon. Non-limiting examples include cyclohexynyl.

The term "cycloalkylene" group refers to a divalent radical formed by the removal of two hydrogen atoms from one or more rings of a cycloalkyl group, as defined above.

The term "cycloalkenylene" group refers to a stable aliphatic 5-15-membered monocyclic or polycyclic, divalent radical having at least one carbon-carbon double bond, which comprises one or more rings connected or bridged together. Unless mentioned otherwise, the cycloalkenylene radical can be linked at any desired carbon atom provided that a stable structure is obtained. If the cycloalkenylene radical is substituted, this may be so at any desired carbon atom, once again provided that a stable structure is obtained. Non-limiting examples thereof include cyclopentenylene, cyclohexenylene, cycloheptenylene, cyclooctenylene, cyclononenylene, cyclodecenylene, norbornenylene, 2-methylcyclopentenylene, 2-methylcyclooctenylene, and the like.

The term "cycloalkynylene" group refers to a stable aliphatic 8- to 15-membered monocyclic or polycyclic divalent radical having at least one carbon-carbon triple bond and consisting solely of carbon and hydrogen atoms which may comprise one or more fused or bridged ring(s), preferably a 8- to 10-membered monocyclic or 12- to 15-membered bicyclic ring. Unless otherwise specified, the cycloalkynylene ring may be attached at any carbon atom which results in a stable structure and, if substituted, may be substituted at any suitable carbon atom which results in a stable structure. Non-limiting examples include cyclooctynylene, cyclononynylene, cyclodecynylene, 2-methylcyclooctynylene, and the like.

The term "heterocyclic group" refers to a C2 to C30 heterocycloalkyl group, a C2 to C30 heterocycloalkylene group, a C2 to C30 heterocycloalkenyl group, a C2 to C30 heterocycloalkenylene group, a C2 to C30 heterocycloalkynyl group, a C2 to C30 heterocycloalkynylene group, a C2 to C30 heteroaryl group, or C2 to C30 heteroarylene group that include 1 to 3 heteroatoms selected from O, S, N, P, Si, and a combination thereof in one ring, and specifically a C2 to C15 heterocycloalkyl group, a C2 to C15 heterocycloalkylene group, a C2 to C15 heterocycloalkenyl group, a C2 to C15 heterocycloalkenylene group, a C2 to C15 heterocycloalkynyl group, a C2 to C15 heterocycloalkynylene group, a C2 to C15 heteroaryl group, or a C2 to C15 heteroarylene group, wherein the foregoing heterocyclic groups each include 1 to 3 heteroatoms selected from O, S, N, P, Si, and a combination thereof in one ring. Other heteroatoms may also be present.

The term "ketone" group refers to a —C(=O)R group, wherein R is an aliphatic group as defined below, having the specified number of carbon atoms, for example a C2 to C30 ketone group, and specifically a C2 to C18 ketone group, wherein the carbon of the carbonyl group is included in the specified number of carbon atoms.

The term "aryl" group refers to a cyclic group in which all ring members are carbon and at least one ring is aromatic, the group having the specified number of carbon atoms, for example a C6 to C30 aryl group, and specifically a C6 to C18 aryl group, and having a valence of at least one, optionally substituted with one or more substituents where indicated, provided that the valence of the aryl group is not exceeded. More than one ring may be present, and any additional rings may be independently aromatic, saturated or partially unsaturated, and may be fused, pendant, spirocyclic, or a combination thereof.

The term "arylene" group refers to a divalent radical formed by the removal of two hydrogen atoms from one or more rings of an aromatic hydrocarbon, wherein the hydrogen atoms may be removed from the same or different rings, each of which rings may be aromatic or nonaromatic, and having the specified number of carbon atoms, for example a C6 to C30 arylene group, and specifically a C6 to C16 arylene group.

A "heteroaryl" group refers to a monovalent carbocyclic ring group that includes one or more aromatic rings, in which at least one ring member (e.g., one, two or three ring members) is a heteroatom. In a C3 to C30 heteroaryl, the total number of ring carbon atoms ranges from 3 to 30, with remaining ring atoms being heteroatoms. Multiple rings, if present, may be pendent, spiro or fused. The heteroatom(s) are independently chosen from N, O, S, Si, or P.

A "heteroarylene" group refers to a divalent radical formed by the removal of two hydrogen atoms from one or more rings of a heteroaryl moiety, as defined above, wherein the hydrogen atoms may be removed from the same or different rings (preferably the same ring), each of which rings may be aromatic or nonaromatic.

The term "(meth)acrylate" refers to an acrylate group ($H_2C=CH-C(=O)O-$) and a methacrylate group ($H_2C=C(CH_3)-C(=O)-$), and (meth)acryloxy refers to an acryloxy group and a methacryloxy group.

As used herein, the term "sulfonated olefin" refers to a product resulting from sulfonation of a C2 to C30 alkene, wherein an alkene is as defined herein.

As used herein, the term "a sulfonated product of fatty acid nitrile", refers to a product resulting from sulfonation of a C3 to C30 alkenylcyanide, wherein the number of carbon atoms does not include the carbon atom of the cyano group.

As used herein, the term "fat amine" refers to an alkylamine including a C4 to C28 alkyl group as defined herein.

As used herein, the term "fatty acid amine" refers to an amino acid including a C4 to C28 aliphatic chain.

As used herein, the term "a quaternary ammonium salt of benzimidazoline", refers to a salt of a benzimidazoline cation with an anion, wherein a nitrogen in the ring is substituted with two aliphatic groups, two aromatic groups, two heteroaromatic groups, or a combination thereof. The anion is a halide.

As used herein, the term "alkyl alkoxylated sulfate" refers to a compound of the formula $ROSO_3M$, wherein R is an alkyl group as defined herein, and M is an alkali metal.

As used herein, the term "Hofmann-degradated poly (meth)acrylamide" refers to a polymer wherein all or part of the amide groups of the poly(meth)acrylamide, are converted into amine groups.

The term "combination thereof" refers to a combination comprising at least one of the named constituents, components, compounds, or elements, optionally together with one or more of the same class of constituents, components, compounds, or elements not named.

According to an embodiment, a resistance heating composition includes a silicone emulsion particle, a carbon nanotube, and an aqueous medium.

Unlike existing laser printers in which heat generated by, for example, a halogen lamp installed inside a fusing apparatus, is transferred to a surface of the fusing apparatus, when a fusing apparatus has a heating composite layer that directly generates heat on a surface thereof, heat loss caused by heat transfer may be reduced, and a higher temperature increase rate may be achieved. The resistance heating composition may be used in forming a heating composite layer of such a fusing apparatus.

Carbon nanotubes are a nano material with strong mechanical strength, high thermal conductivity, and high chemical stability. Carbon nanotubes have a thermal capacity of about 0.9 Joules per Kelvin per cubic centimeter ($J/cm^3 \cdot K$) per unit volume, which is very low as compared with other conductive filler materials, for example, stainless steel having a thermal capacity per unit volume of about $3.6 \, J/cm^3 \cdot K$, and have a high thermal conductivity of about 3,000 Watts per meter Kelvin ($W/m \cdot K$), and thus, may have a higher temperature increasing efficiency than existing conductive filler materials.

To prepare a highly conductive resistance heating composite including a large amount of carbon nanotubes, the resistance heating composition may use emulsion-phase silicon rubber as a binder resin for dispersing the carbon nanotubes.

The silicone emulsion particle included in the resistance heating composition, may be of an oil-in-water emulsion type in which oily fine particles are dispersed in an aqueous medium. The silicone emulsion particle is not limited however, and may be any emulsion particle using a silicon-containing resin which includes silicon rubber, such as polydimethylsiloxane, as a main component.

Silicone emulsions may be prepared using a known method, such as mechanical emulsification, emulsification polymerization, or a known commercially available method. For example, one of the following three known methods may be used to prepare an oil-in-water silicone emulsion. A first method includes emulsifying a pre-formed organosiloxane polymer using a surfactant and a mechanical method, i.e., shear force by mechanical emulsification. A second method is a suspension polymerization method of a reactive oligomeric organosiloxane which includes mechanical emulsification of an organosiloxane oligomer, and polymerization of the oligomer in the emulsion particle to provide a large molecular weight organopolysiloxane. A third method, known as emulsion polymerization, uses an organosiloxane precursor, such as cyclosiloxane or alkoxysilane, which may diffuse in water when a composition changes to its original phase or is hydrolyzed. In a silicone emulsion polymerization process, a silicone polymer may be synthesized from a starting siloxane precursor, and a new emulsion particle containing the silicon polymer may be obtained by polymerization.

The silicone emulsion particle used in the resistance heating composition may be prepared for use by any known method, and may be any commercially available silicone emulsion particle.

In an embodiment, the silicone emulsion particle dispersed in an aqueous medium, may be surface-treated with a silicone emulsifying surfactant including a cationic surfactant, an anionic surfactant, a nonionic surfactant, an amphoteric surfactant, or a combination thereof.

The silicone emulsifying surfactant may be any surfactant known to be suitable for emulsifying silicone, and may be a mixture of a cationic surfactant, anionic surfactant, nonionic surfactant and/or amphoteric surfactant, or a mixture of surfactants of the same type. The silicon emulsifying cationic surfactant, anionic surfactant, nonionic surfactant, and amphoteric surfactant may be the same as or different from the carbon nanotube dispersing cationic surfactant, anionic surfactant, nonionic surfactant, and amphoteric surfactant described below.

Non-limiting examples of the cationic surfactant are C8-C22 alkyl trimethyl ammonium halide wherein the halide ion is fluoride, chloride, bromide, or iodide, C8-C22 alkyl dimethyl benzyl ammonium halide or di(C8-C22 alkyl)dimethyl ammonium halide (wherein, a C8-C22 alkyl group is, for example, octyl, decyl, dodecyl, hexadecyl, oleyl, octadecyl, tallow or coco alkyl group), a fat amine, fatty acid amine and a derivative thereof, a basic pyridinium-containing compound such as pyridinium or pyridinium substituted with a halogen, an aliphatic group, an aromatic group, or a heteroaromatic group, a quaternary ammonium salt of benzimidazoline, an alkylamine salt, a quaternary ammonium salt such as poly(ethoxylated/propoxylated) amine, or a combination thereof. Use of a chloride halide ion is specifically mentioned. Methosulfate, phosphate or acetate may be used as alternatives for the halide ion.

Non-limiting examples of the anionic surfactant are alkyl sulfates, such as lauryl sulfate, 7-ethyl-2-methyl-4-undecyl sulfate, 2-ethylhexyl sulfate, octyl sulfate, or the like, a polymer such as an acrylate or a C10-C-30 alkyl acrylate crosspolymer (i.e., a C10-C30 alkyl propenoate polymer with 2-propenoic acid, 2-methyl-2-propenoic acid and/or one of their simple esters, product with 2-propenyl sucrose ether or 2-propenyl 2,2-dihydroxymethyl-1,3-propanediol ether, (C6-C20 alkyl)benzenesulfonic acid and a salt thereof, such as undecyl benzenesulfonic acid, tridecyl benzenesulfonic acid, tetradecyl benzenesulfonic acid, pentadecyl benzene sulfonic acid, hexadecyl benzenesulfonic acid, heptadecyl benzene sulfonic acid, dodecyl benzenesulfonic acid sodium salt, dodecyl benzenesulfonic acid aluminum salt, dodecyl benzenesulfonic acid calcium salt, dodecyl benzenesulfonic acid potassium salt, undecyl benzenesulfonic acid sodium salt, undecyl benzenesulfonic acid ammonium salt, or the like, a sulfate ester of monoalkyl polyoxyethylene ether, such as laureth sulfate, myreth sulfate, pareth sulfate, or the like, a sulfonated glyceryl ester of a fatty acid, a salt of a sulfonated monovalent alcohol ester, an amide of an amino sulfonic acid, a sulfonated product of fatty acid nitrile, a condensate of naphthalene sulfonic acid and formaldehyde, alkali metal alkyl sulfate, wherein the alkali metal includes a Group 1 element such as Li, Na, K, Rb, Cs, or Fr, alkali metal ester sulfate, such as an alkali metal of a C1 to C30 alkylsulfate, an alkali metal of a C6 to C30 aryl sulfate, or an alkali metal of a C5 to C30 heteroaryl sulfate, alkyl phosphate, such as a C1 to C30 alkyl phosphate including methyl phosphate, dimethyl phosphate, triethylphosphate, dimethyl propyl phosphate, or the like, sarcosinate (i.e., sodium [dodecanoyl(methyl) amino]acetate), sulfonated olefin, aromatic sulfonic acid, such as dodecyl phenyl ether sulfonate, monosoap, ether sulfate, phosphate, carboxylic acid, or a combination thereof.

The silicone emulsion particle may be surface-treated with an anionic surfactant including an alkyl sulfate, an acrylate, a C10-C30 alkyl acrylate crosspolymer, a (C6-C20 alkyl)benzenesulfonic acid or a salt thereof, a sulfate ester of monoalkyl polyoxyethylene ether, a sulfonated glyceryl ester of a fatty acid, a salt of a sulfonated monovalent alcohol ester, an amide of an amino sulfonic acid, a sulfonated product of a fatty acid nitrile, a condensate of naphthalene sulfonic acid and formaldehyde, an alkali metal alkyl sulfate, an alkali metal ester sulfate, alkyl phosphate, sarcosinate, sulfonated olefin, or a combination thereof.

Non-limiting examples of the nonionic surfactant are polyethylene glycol including a C9-C22 ethylene long-chain, alkyl ether, polyoxyalkylene sorbitan ether, polyoxyalkylene alkoxylate ester, polyoxyalkylene alkylphenol ether, ethylene oxide propylene oxide copolymer, polyvinyl alcohol, glyceride ester, polyoxyalkylene alkyl ether such as alkylpolysaccaride, or polyoxyethylene alkyl ether, polyoxyethylene alkyl phenyl ether, polyoxyalkylene octyl phenyl ether, polyoxyalkylene nonyl phenyl ether, polyoxyalkyl dibuty phenyl ether, polyoxyalkyl styryl phenyl ether, polyoxy alkyl benzy phenyl ether, polyoxyalkyl biphenyl ether, polyoxyalkyl cumyl phenyl ether, sorbitan fatty ester, polyoxyalkylene sorbitan fatty ester, polyoxyalkylene fatty ester, polyoxyalkylene fatty diester, or a combination thereof. Use of polyethylene glycol including a C12-C14 ethylene long-chain, is specifically mentioned.

Examples of the amphoteric surfactant are cocamidopropyl betaine, cocamidopropyl hydroxyl sulfate, coco-betaine, sodium cocoamidoacetate, cocodimethyl betaine, N-coco-3-aminobutyric acid, alkyl betaine, amine oxide, an imidazolinium carboxyl compound, or a combination thereof.

In an embodiment, the silicone emulsion particle dispersed in an aqueous medium may be surface-treated with a cationic surfactant or an anionic surfactant. For example, the silicone emulsion particle dispersed in an aqueous medium may be surface-treated with an anionic surfactant such as a sulfonate-containing anionic surfactant, sulfate-containing anionic surfactant, or a combination thereof.

In an embodiment, the silicone emulsion particle may have an average particle diameter of about 0.01 micrometers ($\mu m$) to about 10 $\mu m$. For example, the silicone emulsion particle may have an average particle diameter of about 0.1 $\mu m$ to about 1 $\mu m$, more particularly about 0.2 $\mu m$ to about 0.5 $\mu m$. Generally, when the silicone emulsion particles have an average particle diameter of about 0.2 $\mu m$ or greater, the silicone emulsion particles may appear creamy white. When the silicone emulsion particles have an average particle diameter of about 0.2 $\mu m$ or less, for example, from about 0.1 $\mu m$ to about 0.15 $\mu m$, the silicone emulsion particles may appear bluish white. When the silicone emulsion particles have an average particle diameter of about 0.1 $\mu m$ or less, the silicone emulsion particles may appear to be translucent or transparent. In an embodiment, a silicone emulsion particle which may appear creamy white may be used in preparing the resistant heating composition.

The silicone emulsion particle having a submicron size may enable uniform dispersion of carbon nanotubes among the silicone emulsion particles, thus ensuring preparation of a highly conductive heating composite by disposing a low-viscosity resistance heating composition on a substrate.

Further, the silicone emulsion particle may function as a soft filler as an alternative to an inorganic filler, which may be included in the resistance heating composition as described below, which may improve heat-resistance, mechanical strength, and electric conductivity depending on the size and shape of the silicone emulsion particle.

When the amount of carbon nanotubes included in the resistance heating composition is high, unlike when the amount of carbon nanotubes is low where percolation theory applies, an excluded volume effect of the inorganic filler added together may improve electric conductivity even with use of the same amount of carbon nanotubes. The silicone emulsion particle may provide an excluded volume effect instead of the inorganic filler. The silicone emulsion particle may be used in a relatively increased amount instead of using the inorganic filler, and thus improve formability of the resistance heating composition.

The carbon nanotubes used in the resistance heating composition may be any type of carbon nanotubes, for example, single-walled carbon nanotubes, double-walled carbon nanotubes, multi-walled carbon nanotubes, or bundled carbon nanotubes, which may be used alone or in combination with at least two thereof. For example, multi-walled carbon nanotubes may be used due to economic feasibility.

Carbon nanotubes with a hydrophilic functional group disposed on a surface thereof to prevent or reduce cohesion and improve dispersity in an aqueous medium may be used. The carbon nanotubes with the hydrophilic functional group may be carbon nanotubes that are surface-treated with a carbon nanotube dispersing surfactant including a cationic surfactant, an anionic surfactant, a nonionic surfactant, an amphoteric surfactant, or a combination thereof. The carbon nanotube dispersing surfactant may be any surfactant known to disperse carbon nanotubes. The carbon nanotube dispersing cationic surfactant, anionic surfactant, nonionic surfactant, and amphoteric surfactant may be the same as or different from the silicon emulsifying cationic surfactant, anionic surfactant, nonionic surfactant, and amphoteric surfactant described above.

Non-limiting examples of the carbon nanotube dispersing surfactant include dodecyltrimethylammonium bromide, tetradecyltrimethylammonium bromide, cetyltrimethylammonium bromide, cetyldimethylethylammonium bromide, alkyl-trimethyl-ammonium bromide, alkylamine, alkyl imidazoline, ethoxylated amine, alkylamine oxide, lauramine oxide, dicetyldimonium chloride, cetrimonium chloride, primary, secondary, or tertiary polyethoxylated fat amine salt, a quaternary ammonium salt, tetraalkylammonium, alkylamidoalkylammonium, trialkylbenzylammonium, trialkylhydroxyalkylammonium, alkylpyridinium chloride or bromide, an imidazoline derivative, a cationic amine oxide, or a combination thereof.

Non-limiting examples of the carbon nanotube dispersing anionic surfactant are sodium dodecyl sulfate, alkylbenzene sulfonate, a olefin sulfonate, paraffin sulfonate, alkyl ester sulfonate, alkyl sulfate, alkyl alkoxy sulfate, alkyl sulfonate, ether sulfate, alkyl alkoxy carboxylate, alkyl alkoxylated sulfate, monoalkyl(ether) phosphate, dialkyl(ether) phosphate, sarcosinate, sulfosuccinate, isethionate, taurate, ammonium lauryl sulfate, ammonium laureth sulfate, triethylamine lauryl sulfate, triethylamine laureth sulfate, triethanolamine lauryl sulfate, triethanolamine laureth sulfate, monoethanolamine lauryl sulfate, monoethanolamine laureth sulfate, diethanolamine lauryl sulfate, diethanolamine laureth sulfate, lauric acid monoglyceride sodium sulfate, sodium lauryl sulfate, sodium laureth sulfate, potassium lauryl sulfate, potassium laureth sulfate, sodium lauryl phosphate, sodium tridecyl phosphate, sodium behenyl phosphate, sodium laureth-2 phosphate, sodium ceteth-3 phosphate, sodium trideceth-4 phosphate, sodium dilauryl phosphate, sodium ditridecyl phosphate, sodium ditrideceth-6 phosphate, sodium lauroyl sarcosinate, lauroyl sarcosine, cocoyl sarcosine, ammonium cosyl sulfate, sodium cosyl sulfate, sodium trideceth sulfate, sodium tridecyl sulfate, ammonium trideceth sulfate, ammonium tridecyl sulfate, sodium cocoyl isethionate, disodium laurate sulfosuccinate, sodium methyl oleoyl taurate, sodium laurate carboxylate, sodium trideceth carboxylate, sodium lauryl sulfate, potassium cosyl sulfate, potassium lauryl sulfate, monoethanolamine cosyl sulfate, sodium tridecyl benzene sulfonate, ether sulfonate such as dodecyl phenyl ether sulfonate, sodium dodecyl benzene sulfonate, sodium dodecyl sulfate, or a combination thereof.

The anionic surfactant for dispersing the carbon nanotubes may include a sodium dodecyl sulfate, alkylbenzene sulfonate, a olefin sulfonate, paraffin sulfonate, alkyl ester sulfonate, alkyl sulfate, alkyl alkoxy sulfate, alkyl sulfonate, ether sulfate, alkyl alkoxy carboxylate, alkyl alkoxylated sulfate, monoalkyl(ether) phosphate, dialkyl(ether) phosphate, sarcosinate, sulfosuccinate, isethionate, taurate, ammonium lauryl sulfate, ammonium laureth sulfate, triethylamine lauryl sulfate, triethylamine laureth sulfate, triethanolamine lauryl sulfate, triethanolamine laureth sulfate, monoethanolamine lauryl sulfate, monoethanolamine laureth sulfate, diethanolamine lauryl sulfate, diethanolamine laureth sulfate, lauric acid monoglyceride sodium sulfate, sodium lauryl sulfate, sodium laureth sulfate, potassium lauryl sulfate, potassium laureth sulfate, sodium lauryl phosphate, sodium tridecyl phosphate, sodium behenyl phosphate, sodium laureth-2 phosphate, sodium ceteth-3 phosphate, sodium trideceth-4 phosphate, sodium dilauryl phosphate, sodium ditridecyl phosphate, sodium ditrideceth-6 phosphate, sodium lauroyl sarcosinate, lauroyl sarcosine, cocoyl sarcosine, ammonium cosyl sulfate, sodium cosyl sulfate, sodium trideceth sulfate, sodium tridecyl sulfate, ammonium trideceth sulfate, ammonium tridecyl sulfate, sodium cocoyl isethionate, disodium laurate sulfosuccinate, sodium methyl oleoyl taurate, sodium laurate carboxylate, sodium trideceth carboxylate, sodium lauryl sulfate, potassium cosyl sulfate, potassium lauryl sulfate, monoethanolamine cosyl sulfate, sodium tridecyl benzene sulfonate, ether sulfonate, sodium dodecyl benzene sulfonate, sodium dodecyl sulfate, or a combination thereof.

Non-limiting examples of the carbon nanotube dispersing nonionic surfactant are an aliphatic (C6 to C18) primary or secondary linear or branched acid, alcohol or phenol, alkyl ethoxylate, alkyl phenol alkoxylate, a block oxyalkylene condensate of alkyl phenol, an oxyalkylene condensate of alkanol, an oxyethylene/oxypropylene block copolymer, a semi-polar nonionic material (for example, amine oxide and phosphine oxide), polyoxyalkylene octyl pheyl ether, alkylamine oxide, mono or dialkyl alkanolamide, alkyl polysaccharide, sugar ester-based surfactant including sorbitan fatty acid ester, or polyoxyethylene sorbitan fatty acid ester, polyoxyethylene fatty diester, polyoxyethylene sorbitol ester, polyoxyethylenic acid, polyoxyethylene alcohol, polyoxyethylene alkyl ether, polyoxyethylene alkyl phenyl ether, polyoxyethylene-polypropylene glycol, coco mono or diethanolamide, coco diglycoside, alkyl polyglycoside, cocamidopropyl, lauramine oxide, Polysorbate 20, ethoxylated linear alcohol, cetearyl alcohol, lanolin alcohol, stearic acid, glyceryl stearate, PEG-100 stearate, Oleth 20 TX-100(Trion X-100), Brij 56(C16EO$_{10}$), Brij 78(C$_{18}$EO$_{20}$), and P123 (EO$_{20}$PO$_{70}$EO$_{20}$), or a combination thereof.

In an embodiment, carbon nanotubes may be surface-treated with a cationic surfactant or anionic surfactant. The carbon nanotube may be surface-treated to have a charge opposite to a charge of the silicone emulsion particle.

In an embodiment, the carbon nanotube may be surface-treated with a surfactant for dispersing carbon nanotubes, the primary surface treatment with a surfactant, then with a polyelectrolyte having an opposite charge to the surfactant for dispersing carbon nanotubes, the secondary surface treatment with a polyelectrolyte. The surfactant for dispersing carbon nanotubes may be an anionic surfactant, and the polyelectrolyte may be a cationic polyelectrolyte, described below.

A polyelectrolyte refers to a polymer with a dissociable electrolyte group in a polymer chain including main and side chains. With dissociation of the dissociable electrolyte group in the polyelectrolyte, the polyelectrolyte is decomposed into low-molecular weight ions and high-molecular weight ions. The high-molecular weight ions have a chain structure originating from the polyelectrolyte, and are referred to as "high molecular weight ions". Polymer ions with positive charges may be generated from a cationic polyelectrolyte. A non-limiting example of the cationic polyelectrolyte is a polymer with a nitrogen atom in a main or side chain thereof. The nitrogen atom may form an amine structure or ammonium structure. The amine structure may be transformed into an ammonium structure using an appropriate reaction condition.

Non-limiting examples of the cationic polyelectrolyte including a nitrogen atom in a main or side chain are polyamine, including polyamidoamine, polyallylamine, such as polyallylamine hydrochloride ("PAH"), polyethylenimine ("PEI"), polydiallyldimethylammonium chloride ("PDDA"), polymethacryloxyethyltrialkylammonium halide, aminoethylated polyacrylamide, Hofmann-degradated poly(meth)acrylamide, poly(acrylamide-co-diallydimethylammonium chloride), polyethyleneamine, polysaccharides, such as cationized starch, chitosan, and chitosan-containing compounds, poly(diallyldimethylammonium chloride), poly(amino methacrylate) including poly(dialkylaminoalkyl methacrylates), such as poly(dimethylaminoethyl methacrylate) and poly(diethylaminoethyl methacrylate), polyvinylamine, polyvinylpyridine including quaternary polyvinyl pyridine, such as poly(N-ethyl-4-vinylpyridine), poly(vinylbenzyltrimethylamine), poly(diallydialkylamine), such as poly(diallydimethylammonium chloride), spermine, spermidine, or a combination thereof.

The cationic polyelectrolyte may include a polyallylamine hydrochloride ("PAH"), polyethylenimine ("PEI"), polydiallyldimethylammonium chloride, polymethacryloxyethyltrialkylammonium halide, polyarylamine chloride, polyacrylamide, aminoethylated polyacrylamide, polyvinylamine, Hofmann-degradated poly(meth)acrylamide, polyethyleneamine, cationized starch, chitosan, or a combination thereof.

A polyelectrolyte with an opposite charge to that of the primary surface-treated surfactant may be readily disposed or stacked on the surfaces of the carbon nanotubes by ionic self-assembly. For example, carbon nanotubes that are primary surface-treated with an anionic surfactant may be further secondary surface-treated with a cationic polyelectrolyte, and then combined (e.g., mixed) with the silicone emulsion particles. The carbon nanotubes that are surface-treated with a cationic polyelectrolyte in the secondary surface treatment may be effectively mixed with the silicone emulsion particles dispersed in an aqueous medium and surface-treated with an anionic surfactant.

As described above, carbon nanotubes that are surface-treated with a surfactant and/or a polyelectrolyte to have a charge opposite to a charge of the silicone emulsion particles may be used to improve electric conductivity and formability of the resistance heating composition.

Figure 1:
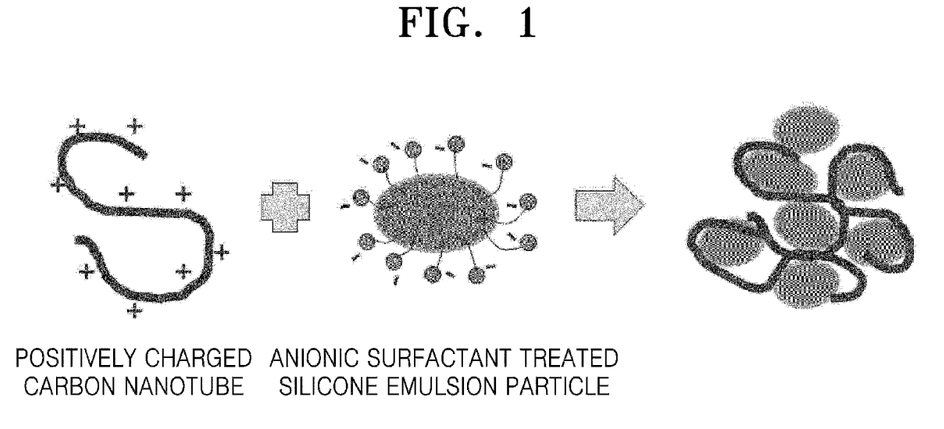
FIG. 1 is a conceptual view of a resistance heating composition according to an embodiment as disclosed herein.

FIG. 1 is a conceptual view illustrating a process of forming a resistance heating composition using a silicone emulsion particle that is aqueously dispersed and surface-treated with an anionic surfactant adsorbed on the surface thereof, and carbon nanotubes that are aqueously dispersed and surface-treated with cations on surfaces thereof using a cationic surfactant or cationic polyelectrolyte.

As illustrated in FIG. 1, when forming a resistance heating composition using silicone emulsion particles and carbon nanotubes with opposite charges, the carbon nanotubes may densely bind to around the silicone emulsion particles by electrostatic attraction, and thus may maximize an excluded volume effect. While not wishing to be bound by theory, it is believed this may improve electric conductivity and may prevent or reduce breakage of the silicone material against deformation of the resistance heating composite by external stress, and prevent or reduce reduction in electric conductivity.

The amount of the carbon nanotubes in the resistance heating composition is not particularly limited, and may be within a range in which the resistance heating composition exhibits effective heating characteristics. Also, the carbon nanotubes may be uniformly dispersed among the silicon emulsion particles. For example, the silicon emulsion particle and the carbon nanotube may be in a weight ratio of about 100:0.1 to about 100:100. For example, the silicon emulsion particle and the carbon nanotube may be in a weight ratio of about 100:1 to about 100:70 by weight, more particularly, of about 100:1 to about 100:50.

The resistance heating composition may use an aqueous medium for dispersing the silicone emulsion particles and the carbon nanotubes. Examples of the aqueous medium may be water or a combination of water and an organic solvent (water-miscible organic solvent) which is miscible with water at room temperature. For example, about 90 weight percent (wt %) or more of the aqueous medium may be water, and in an embodiment, about 95 wt % or more of the aqueous medium may be water, and in another embodiment, about 100 wt % of the aqueous medium may be water, based on a total weight of the aqueous medium.

Non-limiting examples of the organic solvent miscible with water at room temperature are a C2-C6 monoalcohol (for example, ethanol, isopropanol, or the like); a C2-C20 polyol, for example, C2-C12 polyol, more particularly, C2-C6 polyol (for example, glycerol, propylene glycol, butylene glycol, pentylene glycol, hexylene glycol, dipropylene glycol, diethylene glycol, or the like); glycol ether, and more particularly, C3-C16 glycol ether (for example, C1-C4 alkyl ether of mono-, di- or tripropylene glycol; or a combination thereof.

The aqueous medium may control the viscosity of the resistance heating composition for use with a spraying method. The amount of the aqueous medium is not specifically limited. In an embodiment, the amount of aqueous medium used may be several hundreds times the weight of the silicone emulsion particles. In an embodiment, the amount of the aqueous medium may be about 5 to about 50,000 parts by weights based on 100 parts by weight of the silicone emulsion particle, and more particularly, about 10 to about 2,000 parts by weight, about 20 to about 1,000 parts by weight, or about 25 to about 900 parts by weight, based on 100 parts by weight of the silicone emulsion particles. The amount of the aqueous medium may be increased or reduced for viscosity adjustment.

The resistance heating composition may further include an inorganic filler to improve heat-resistance, electric conductivity, and/or mechanical strength. Non-limiting examples of the inorganic filler are calcium carbonate, magnesium carbonate, calcium sulfate, magnesium sulfate, iron oxide, zinc oxide, magnesium oxide, aluminum oxide, calcium oxide, titanium oxide, calcium hydroxide, magnesium hydroxide, aluminum hydroxide, amorphous silica, fumed silica, synthetic silica, natural zeolite, synthetic zeolite, bentonite, activated clay, talc, kaolin, mica, diatomite, clay, or a combination thereof. These compounds may be used alone or in combination of at least two thereof.

The resistance heating composition may further include an appropriate additive, for example, an oxidation-resistant stabilizer, a weather-resistant stabilizer, an antistatic agent, a dye, a pigment, a dispersing agent, a coupling agent, or a combination thereof, provided that the heating efficiency of the resistance heating composition is not significantly adversely affected.

The resistance heating composition may have a range of viscosities that is not specifically limited, provided that the resistance heating composition may be effectively disposed on a substrate, for example disposed by spraying without clogging spray nozzles. For example, the viscosity may be about 10 seconds to about 30 seconds (#4 Ford Cup 4), which is appropriate for the resistance heating composition to be sprayed up. However, the amount of the aqueous medium may be increased or reduced if a viscosity adjustment is required, to avoid clogging spray nozzles.

The resistance heating composition may be used even with such a low viscosity, to form a highly conductive heating composite, and may prevent or reduce breakage of rubber materials when deformed under external stress conditions or when there is a reduction in electric conductivity. Due to use of the aqueous medium, the heating composite may be prepared in an environmentally friendly manner.

According to another embodiment, there is provided a heating composite including a product of the above-described resistance heating composition. The product may be a cured product of the resistance heating composition. In the heating composite, the silicone emulsion particles form a matrix substrate when the resistance heating composition is cured, and the carbon nanotubes are uniformly and densely distributed among the spherical silicone emulsion particles, rather than distributed among amorphous silicone rubber as in existing heating composites. Also, the heating composite may have a higher electric conductivity in the same amount as compared with existing heating composites including the carbon nanotubes distributed among the amorphous silicone rubber. The heating composite may be in the form of a sheet that may be applicable in a heating apparatus for fusing apparatuses.

According to another embodiment, there is provided a method of preparing a heating composite using the above-described resistance heating composition.

The method of preparing the heating composite may include: preparing the above-described resistance heating composition; disposing the resistance heating composition on a substrate; and thermally treating the resistance heating composition disposed on the substrate, to provide the heating composite.

In an embodiment, the preparing of the resistance heating composition may include combining (e.g., mixing) a silicone emulsion particle and an aqueous dispersion solution including a carbon nanotube and an aqueous medium. The silicone emulsion particle may be any commercially available silicone emulsion particle, including an oil-in-water type in which oily fine particles are dispersed in an aqueous medium. The aqueous dispersed carbon nanotube solution may be prepared by dispersing carbon nanotubes in an aqueous medium, and surface-treating the carbon nanotube with an appropriate surfactant for dispersing carbon nanotubes, then with a polyelectrolyte having an opposite charge to the surfactant for dispersing carbon nanotubes. The carbon nanotube dispersing surfactant may be any surfactant known to disperse carbon nanotubes and the surfactant and polyelectrolyte may include a variety of surfactants and polyelectrolytes, taking into consideration miscibility with the silicone emulsion particle, binding strength to silicone emulsion particle, formability, or the like. For example, when the silicone emulsion particle is dispersed in an aqueous medium and surface-treated with an anionic surfactant such as sulfonate-containing anionic surfactant, sulfate-containing anionic surfactant, or a combination thereof, the aqueous dispersed carbon nanotube solution may be prepared by dispersing carbon nanotubes surface-treated with a cationic surfactant, or by dispersing carbon nanotubes surface-treated with an anionic surfactant, then with a cationic polyelectrolyte. In the preparation of the resistance heating composition, the amount of the aqueous medium may be increased to adjust viscosity.

The prepared resistance heating composition is disposed, for example coated on a substrate. The substrate may be a support for a heating composite or any structure formed of the same material as the support. For example, the substrate may be a metal substrate with an insulating layer or a highly heat-resistant plastic substrate.

Non-limiting examples of the highly heat-resistant plastic substrate are polyphenylene sulfide ("PPS"), polyamide-imide, polyimide, polyketone, polyphthalamide ("PPA"), polyether-ether-ketone ("PEEK"), polythersulfone ("PES"), polyimide ("PI"), polyetherimide ("PEI"), or a combination thereof.

The resistance heating composition may be disposed on the substrate by spraying. A spray speed of the resistance heating composition may be controlled to be, for example, about 0.1 milliliters per minute (mL/min) to about 500 mL/min, specifically about 10 mL/min to about 450 mL/min, more specifically about 50 mL/min to about 400 mL/min. A spray distance, the distance between the resistance heating composition and the substrate, may be from about 0.01 meters (m) to about 1 m, particularly from about 0.2 m to about 0.9 m, and more particularly from about 0.3 m to about 0.8 m.

In disposing the resistance heating composition on the substrate, the resistance heating composition may be disposed repeatedly several times with an adjustment of a spraying amount of the resistance heating composition followed by evaporation of the aqueous medium using a subsequent thermal treatment to provide a heating composite with predetermined thickness.

Next, the resistance heating composition disposed on the substrate is thermally treated (e.g., heat treated) to evaporate the aqueous medium from the resistance heating composition and cure the resistance heating composition including a mixture of the silicone emulsion particles and carbon nanotubes, to provide the heating composite. In some embodiments, the silicone emulsion particles may further react, e.g., crosslink. As used herein, "cure" includes evaporation alone or evaporation together with further reaction. For example, the thermal treatment (heat treatment) may include, for example, contacting the substrate with a heat source such as a hot plate, but is not limited thereto. Other methods can be used, such as cure in an oven or exposure to a heat lamp.

The heat treatment may be performed at a temperature of about room temperature (e.g., about 20 to about 25° C.) to about 250° C. For example, the heat treatment may be performed at a temperature of about 5 to about 250° C., more particularly at a temperature of about 120 to about 250° C. The heat treatment temperature for the substrate may vary depending on the material of the substrate, the type of the silicone emulsion particle, a coating thickness of the resistance heating composition on the substrate, or the like.

As a result of the evaporation of the aqueous medium from the resistance heating composition disposed (e.g., coated) on the substrate through the heat treatment, a cured product of the resistance heating composition, that is, a heating composite including the silicon emulsion particles and carbon nanotubes bound together is obtained. The resulting heating composite may have a thickness of about 20 micrometers ($\mu$m) or greater. Specifically, the thickness of the heating composite may be about 100 $\mu$m or greater, more specifically about 300 $\mu$m. The heating composite having a thickness with the foregoing range, is suitable for use in a heating apparatus for fusing apparatuses.

According to another embodiment, there is provided a heating apparatus for fusing apparatuses that includes a heating composite layer including the cured product of the above-described resistance heating composition, and an electrode for supplying electricity to the heating composite layer disposed on the heating composite layer.

The heating composite layer may be formed using the above-described resistance heating composition, and may include a matrix substrate with cured silicone emulsion particles and carbon nanotubes uniformly distributed among the silicone emulsion particles. The components of the resistance heating composition forming the heating composite layer, and a method of forming the heating composite layer are as described above, and detailed descriptions thereof will not be repeated here.

The heating composite layer may further include a releasing layer disposed on an outer surface of the heating composite layer to prevent or reduce an offset of toner, for example, to prevent or reduce toner on paper from adhering to a surface of the heating apparatus. The releasing layer may include a fluoropolymer-based material such as polytetrafluoroethylene ("PTFE").

The heating apparatus for a fusing apparatus may directly generate heat on a surface of the heating composite layer by Joule heat generated by an electric current when electric power is applied to the heating composite layer via the electrode for supplying electricity. Thus, unlike indirect heating in existing heating apparatuses in which heat generated by a halogen lamp is transmitted, thermal loss caused by such heat transmission may be minimized, with a significant reduction in power consumption.

The heating apparatus may further include a support for supporting the heating composite layer, wherein the heating composite layer is disposed on the support. The heating apparatus may be configured in any form, for example as a roll, belt, plate, sheet, or the like. In an embodiment, the heating apparatus may be configured in a roller form or a belt form according to a structure of a fusing apparatus for a printing apparatus such as a laser printer, photocopier, or the like. The shape of the support is determined according to the shape or form of the heating apparatus. For example, the support may be configured in the form of a roller or belt. In an embodiment, a belt form heating apparatus may have a structure without a support.

The support may be formed of any material with stable mechanical properties at a normal operating temperature of a fusing system. The support may be formed of a metal pipe or a highly heat-resistant plastic. Non-limiting examples of the highly heat-resistant plastic are any plastic with stable mechanical characteristics at high temperatures, such as polyphenylene sulfide ("PPS"), polyamide-imide, polyimide, polyketone, polyphthalamide ("PPA"), polyether-ether-ketone ("PEEK"), polythersulfone "(PES"), polyetherimide ("PEI"), or a combination thereof.

When a conductive matrix such as a metal pipe is used as the support, an insulating layer may be further disposed between the support and the heating composite layer to electrically insulate them. When a non-conductive matrix such as highly heat-resistant plastic is used as the support, the insulating layer may not be disposed between the support and the heating composite layer. Materials for the insulating layer are not specifically limited and may be any insulating material. For example, a highly heat-resistant plastic as described above may be used as a material for the insulating layer. Alternatively, a polymer in the form of a sponge or a foam may be used as a material for the insulating layer.

According to another embodiment, there is provided a fusing apparatus for a printing apparatus that includes the above-described heating apparatus and a pressure member disposed opposite to the heating apparatus. A fusing nip is disposed between the heating apparatus and pressure member, and the fusing apparatus may fix toner on a target medium that is heated passing through the fusing nip. The fusing apparatus may be used in a printing apparatus such as a laser printer, a photocopier, or the like.

Hereinafter, embodiments of the fusing apparatus and a printing apparatus including the fusing apparatus will be described in greater detail with reference to the appended drawings.

Figure 2:
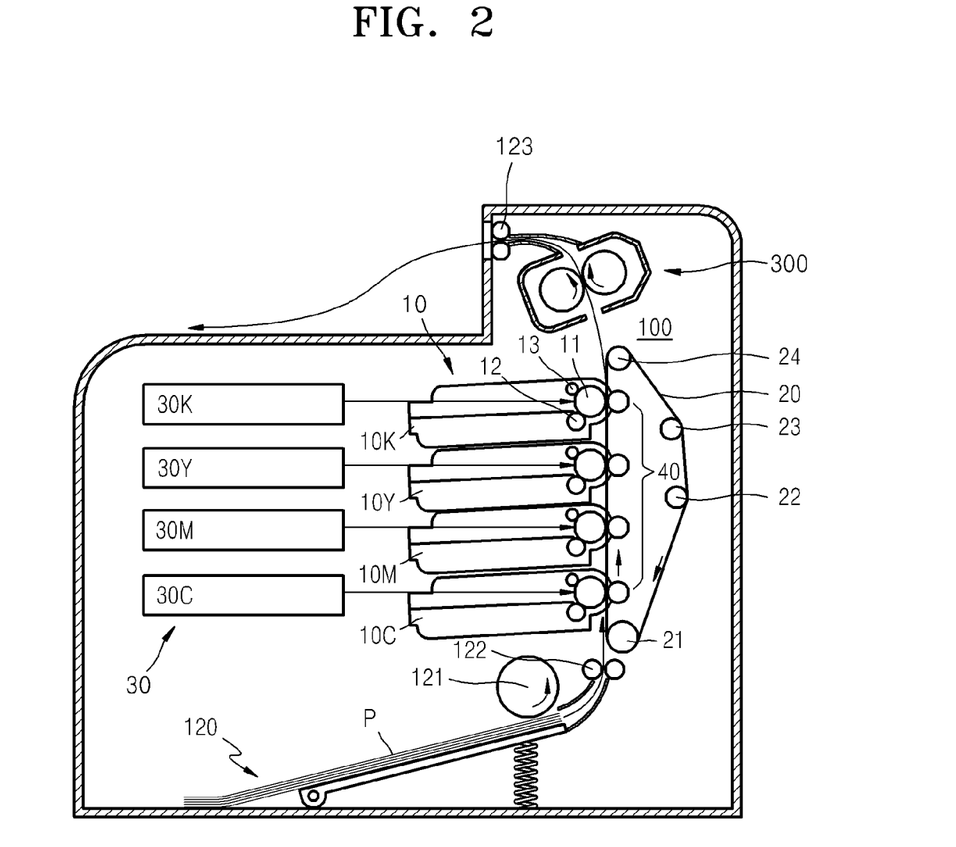
FIG. 2 is a structural diagram of an electrophotographic imaging apparatus that is a printing apparatus including a fusing apparatus, according to an embodiment as disclosed herein.

FIG. 2 is a structural diagram of an electrophotographic imaging apparatus that is an example of a printing apparatus including a fusing apparatus according to an embodiment. Referring to FIG. 2, the electrophotographic imaging apparatus includes a printing unit 100 for electrophotographically printing an image on a recording medium, and a fusing apparatus 300. The electrophotographic imaging apparatus of FIG. 2 is of a dry type that prints a color image using a dry developing agent (e.g., toner).

The printing unit 100 includes an exposing unit 30, a developing unit 10, and a transfer unit (not shown). The printing unit 100 may include four developing units 10C, 10M, 10Y, and 10K that respectively accommodate toner of different colors of cyan (C), magenta (M), yellow (Y), and black (K), and four exposing units 30C, 30M, 30Y, and 30K that respectively correspond to the developing units 10C, 10M, 10Y, and 10K.

The developing units 10C, 10M, 10Y, and 10K each include a photoconductive drum 11 as an image carrier on which an electrostatic latent image is formed, and a developing roller 12 for developing the electrostatic latent image. A charging bias voltage is applied to a charging roller 13 to charge an outer circumferential surface of the photoconductive drum 11 to a uniform potential. A corona charger (not shown) may be used instead of the charging roller 13. The developing roller 12 supplies toner to the photoconductive drum 11 by attaching the toner on an outer circumferential surface thereof. A developing bias voltage for supplying toner to the photoconductive drum 11 is applied to the developing roller 12. Although not illustrated, the developing units 10C, 10M, 10Y, and 10K may each further accommodate a supplying roller for attaching toner therein to the developing roller 12, a regulating member for regulating an amount of toner adhered to the developing roller 12, and a stirrer (not shown) for transferring toner therein to the supplying roller and/or the developing roller 12. In an embodiment, although not illustrated, the developing units 10C, 10M, 10Y, and 10K may each accommodate a cleaning blade for removing toner adhering to the outer circumference of the photoconductive drum 11 before being charged, and a space for the removed toner.

In an embodiment, the transfer unit may include a recording medium conveyor belt 20 and four transfer rollers 40. The recording medium conveyor belt 20 is disposed opposite to the outer circumferential surfaces of the photoconductive drums 11 exposed outside of the developing units 10C, 10M, 10Y, and 10K. The recording medium conveyor belt 20 is supported by a plurality of support rollers 21, 22, 23, and 24, and circulates. The recording medium conveyor belt 20 may be installed in a vertical direction. The four transfer rollers 40 are disposed to face the photoconductive drums 11 of the developing units 10C, 10M, 10Y, and 10K, respectively, with the recording medium conveyor belt 20 disposed therebetween. A transfer bias voltage is applied to the transfer rollers 40. The exposing units 30C, 30M, 30Y, and 30K scan light corresponding to information about the images in colors C, M, Y, and K onto the photoconductive drums 11 of the developing units 10C, 10M, 10Y, and 10K, respectively. The exposing units 30C, 30M, 30Y, and 30K may each be a laser scanning unit ("LSI") using a laser diode as a light source.

A method of forming a color image using the electrophotographic imaging apparatus having the above configuration will now be described.

The photoconductive drum 12 of each of the developing units 10C, 10M, 10Y, and 10K is charged to a uniform potential by a charging bias voltage applied to the charging roller 13. The four exposing units 30C, 30M, 30Y, and 30K scan light corresponding to the information about the images in C, M, Y, B onto the corresponding photoconductive drums 11 of the developing units 10C, 10M, 10Y, and 10K to form electrostatic latent images. When a developing bias voltage is applied to each of the developing rollers 12, toner adhering to the outer circumferences of the developing rollers 12 is transferred onto the electrostatic latent images, forming toner images in C, M, Y and B on the photoconductive drums 11 of the developing units 10C, 10M, 10Y, and 10K.

A final toner receiving medium, for example, a recording medium P, is drawn out of a cassette 120 by a pickup roller 121, and is then moved onto the recording medium conveyor belt 20 by a transfer roller 122. The recording medium P is moved at the same speed as a traveling speed of the recording medium conveyor belt 20 while being adhered to a surface of the recording medium conveyor belt 20 by electrostatic force.

For example, a leading end of the recording medium P may reach a transfer nip that faces the corresponding transfer roller 40 at the same time as when a leading end of the C toner image on the outer circumference of the photoconductive drum 11 of the developing unit 10C reaches the transfer nip. When a transfer bias voltage is applied to the transfer roller 40, the toner image on the photoconductive drum 11 is transferred onto the recording medium P. As the recording medium P is moved, the M, Y, and K toner images on the corresponding photoconductive drums 11 of the developing units 10M, 10Y, and 10K are sequentially transferred to overlap onto the recording medium P, resulting in a color toner image on the recording medium P.

The color toner image transferred on the recording medium P remains on the surface of the recording medium P by electrostatic force. The fusing apparatus 300 fixes the color toner image to the recording medium P using heat and pressure. The recording medium P to which the color image is fixed is discharged out of the imaging apparatus by a discharge roller 123.

To fix a toner image, the fusing apparatus 300 needs to be heated to a temperature that is approximately a predetermined fusing temperature. The shorter the heating time, the shorter the time that it takes until a first page is printed out after a printing instruction is received. In electrophotographic imaging apparatuses, normally, the fusing apparatus 300 is only heated for printing, and is not operated in a standby mode. The fusing apparatus 300 takes time to be heated again when printing is restarted. To reduce the heating time that takes until printing is restarted, the fusing apparatus 300 may be controlled to maintain a predetermined temperature in the standby mode. The preheating temperature of the fusing apparatus 300 in the standby mode may be from about 120° C. to about 180° C. If it takes sufficiently less to heat the fusing apparatus 300 to a printable temperature, no preheating may be necessary in the standby mode, which reduces energy consumption by the fusing apparatus 300.

Figure 3:
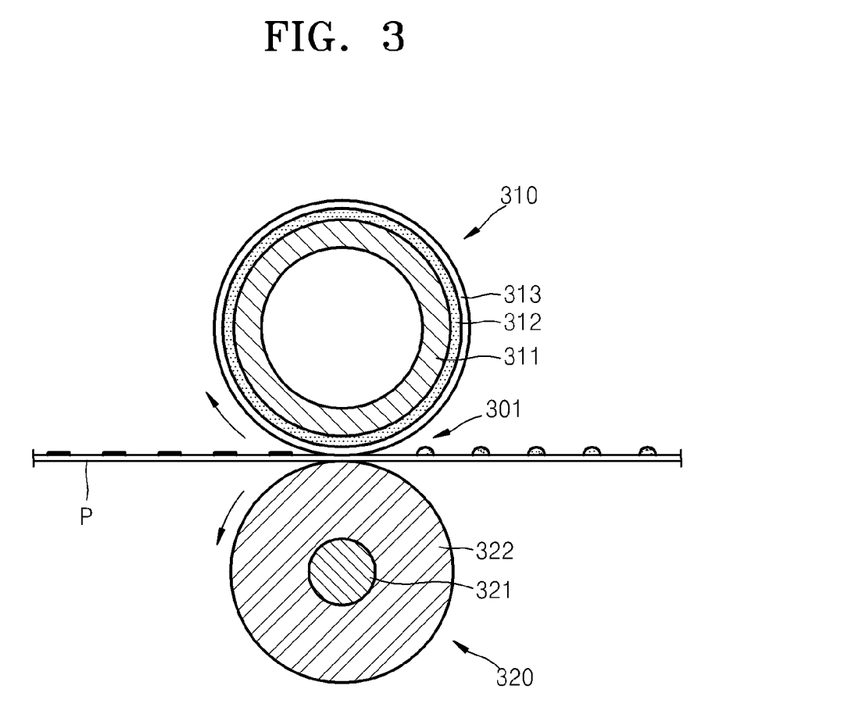
FIG. 3 is a cross-sectional view of a fusing apparatus in the form of a roller according to an embodiment as disclosed herein.
Figure 4:
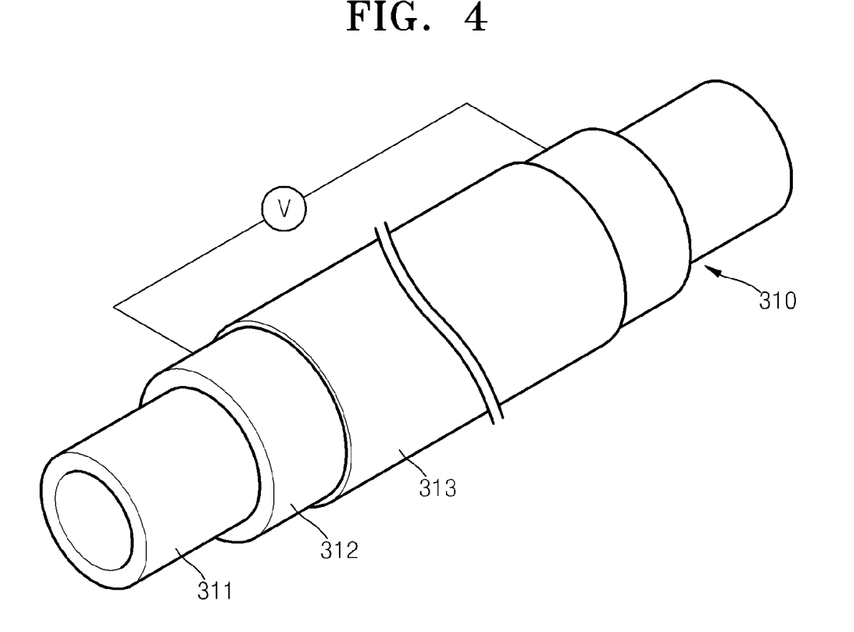
FIG. 4 is a perspective view of a heating apparatus in the fusing apparatus of FIG. 3, according to an embodiment as disclosed herein.

FIG. 3 is a cross-sectional view of a fusing apparatus in the form of a roller according to an embodiment as disclosed herein. FIG. 4 is a perspective view of a heating apparatus in the fusing apparatus of FIG. 3, according to an embodiment. The fusing apparatus of FIG. 3 is a fusing apparatus in the form of a roller using a heating apparatus 310 in the form of a roller.

Referring to FIGS. 3 and 4, the heating apparatus 310 in the form of a roller and a pressure member 320 that forms a fusing nip 301 are disposed opposite to each other. The pressure member 320 forms the fusing nip 301 disposed opposite to the heating apparatus 310. For example, the pressure member 320 may be in the form of a roller including a metal support 321 and an elastic member 322 formed around the metal support 321. The heating apparatus 310 and the pressure member 320 may be biased to be engaged together by a bias unit (not shown), for example, a spring. A partial deformation of the elastic member 322 of the pressure member 320 may result in the fusing nip 301 via which heat from the heating apparatus 310 is transmitted to a toner image on the recording medium P.

The heating apparatus 310 may include a heating composite layer 312, a support 311 supporting the heating composite layer 312, wherein the heating composite layer is disposed on a surface of the support, and a releasing layer 313, disposed on an outer surface of the heating composite layer. Due to use of the support 311 having a hollow pipe shape, the heating apparatus 310 may be in the form of a roller. Such a heating apparatus in the form of a roller used in a fusing apparatus of an electrophotographic imaging apparatus is generally referred to as a fusing roller. Electrodes (not shown) are disposed at both ends of the heating composite layer 312, wherein the electrodes are in contact with the heating composite layer 312 and supply electricity generated by a power supply V to the heating composite layer 312.

Figure 5:
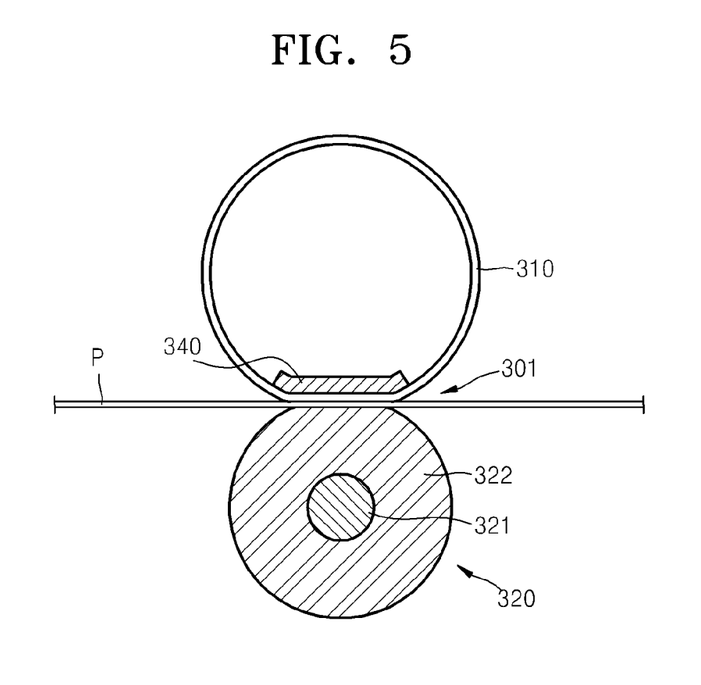
FIG. 5 is a cross-sectional view of a fusing apparatus in the form of a belt according to an embodiment as disclosed herein.

FIG. 5 is a schematic structural view of a fusing apparatus according to another embodiment. The fusing apparatus of FIG. 5 differs from the fusing apparatus of FIG. 3 in that the fusing apparatus is in the form of a belt including a heating apparatus 310 in the form of a belt. Such a heating apparatus 310 in the form of a belt used in a fusing apparatus of an electrophotographic imaging apparatus is generally referred to as a fusing belt. Referring to FIG. 5, the heating apparatus 310, the pressure member 320, and a nip forming member 340 are shown. For example, the pressure member 320 may have the form of a roller including a metal support 321 and an elastic member 322 formed around the metal support 321. The nip forming member 340 is disposed on an inner surface of the heating apparatus 310 in the form of a belt forming a closed loop. The pressure member 320 is disposed opposite the heating apparatus 310. The nip forming member 340 and the pressure member 320 are rotated together with the heating apparatus 310 therebetween to form the fusing nip 301. A bias unit (not shown) applies electric force to the nip forming member 340 and/or the pressure member in a direction in which the nip forming member 340 and the pressure member 320 are engaged with each other. P is a recording medium.

Figure 6:
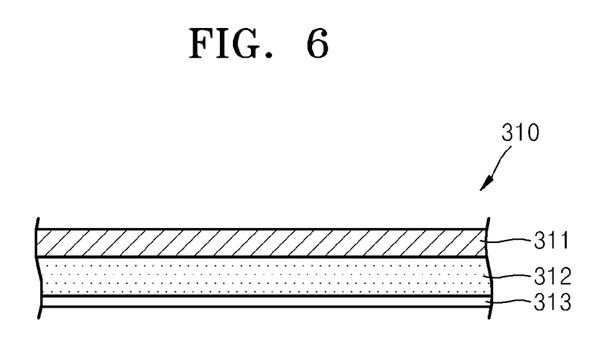
FIG. 6 is a cross-sectional view of a heating apparatus in the fusing apparatus of FIG. 5, according to an embodiment as disclosed herein.
Figure 7:
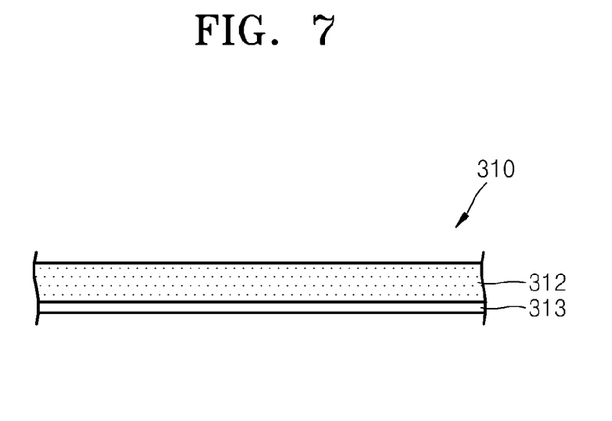
FIG. 7 is a cross-sectional view of a heating apparatus in the fusing apparatus of FIG. 5, according to an embodiment as disclosed herein.

Referring to FIG. 6, which is a cross-sectional view of the heating apparatus 310 in the fusing apparatus of FIG. 5, the heating apparatus 310 may include a support 311, a heating composite layer 312 disposed on an outer surface of the support 311, and a releasing layer 313 disposed on an outer surface of the heating composite layer 312. The support 311 may be flexible enough to deform when the heating apparatus 310 is in the fusing nip and to restore to an original state when the heating apparatus 310 comes out of the fusing nip. In another embodiment, the heating apparatus 310 in the form of a belt may have a structure without the support 311, as shown in FIG. 7, and may include a releasing layer 313 disposed on an outer surface of the heating composite layer 312.

For example, the nip forming member 340 may press on the pressure member 320. Although not illustrated, the nip forming member 340 may have an elastic roller shape or form, and thus may move the heating apparatus 310 by rotating together with the pressure member 320.

Hereinafter, the embodiments will be described in detail with reference to the following examples and comparative examples. However, the following examples and comparative examples are for illustrative purposes only and are not intended to limit the purpose and scope of the embodiments.

EXAMPLE 1

Preparation of a Heating Composite

After 0.05 grams (g) of sodium dodecyl sulfate was homogeneously dissolved in 200 milliliters (ml) of deionized water in a 500-ml beaker, 1 g of multi-walled carbon nanotubes (MWNT) (available from Hanwha Nanotech Corp., grade CM250) was added into the solution, followed by ultrasonic dispersion for about 10 minutes to obtain a dark homogenous, viscous solution. The MWNT residue was removed from the inner wall of the beaker by adding 200 ml of deionized water, followed by ultrasonic dispersion twice, each for about 10 minutes. The resulting MWNT dispersion was subjected to pH adjustment using a 1 Normal (N) HCl diluent, and the pH adjusted dispersion was moved into a 1 liter beaker. 0.25 g of a 20 wt % aqueous solution of poly(diallyldimethylammonium chloride) (available from Aldrich) was added into 200 ml of deionized water, followed by ultrasonication to prepare a diluted additive solution, which was then slowly added using a pipette into the MWNT dispersion. 4.241 g of KM-2002-L-1 (having a solid content of about 60 wt %, available from Shin-Etsu Chemical Co., Ltd.) as a silicone emulsion solution treated with an anionic surfactant was mixed with 200 ml of deionized water to prepare a diluted rubber solution, which was then added to the MWNT dispersion using a pipette while agitating, thereby preparing a resistance heating composition. The amount of the MWNT in the resistance heating composition was about 15.7 by volume %, 27.4 by wt %, and 37.7 by part per hundred resin ("phr"). The resistance heating composition was coated on a polyimide ("PI") substrate using a spray-up process to prepare a heating composite. During the spray-up process the PI substrate was placed to contact a hot plate to maintain a surface temperature thereof at about 200° C. to vaporize the aqueous medium and at the same time to cure the silicone rubber. The resulting heating composite had a thickness of about 200 micrometers (μm) and showed good formability without a break in the silicone rubber.

EXAMPLE 2

Preparation of a Heating Composite

A heating composite was prepared in the same manner as in Example 1, except that NC7000 (available from Nanocyl) was used as a multi-walled carbon nanotubes.

EXAMPLE 3

Preparation of a Heating Composite

A heating composite was prepared in the same manner as in Example 1, except that the amount of the MWNT was adjusted to 5.3 volume %.

COMPARATIVE EXAMPLE 1

Preparation of a Heating Composite Using Polydimethylsiloxane ("PDMS")

Sylgard 184 (available from Dow Corning) was used as polydimethylsiloxane ("PDMS") material. Sylgard 184 is a two-part product including an agent A (Sylgard 184 Silicone Elastomer Base) and an agent B (Sylgard 184 Silicone Elastomer Curing Agent). The agent A, the agent B, and multi-walled carbon nanotubes (MWNT) (CM250, available from Hanwha Nanotech Corp.) were weighed as 68.2 wt %, 6.8 wt %, and 25.0 wt %, respectively, and were then mixed together using a conventional mixer, and further uniformly using a three-roll mill, thereby preparing a resistance heating composition. This resistance heating composition was coated as a thin film having a uniform thickness on a flat PI substrate using a film applicator, and then cured at about 200° C., thereby preparing a heating composite.

COMPARATIVE EXAMPLE 2

Preparation of Heating Composite Using a Rubber Material (TEJ2742)

TEJ2742 (available from Shin-Etsu Chemical Co., Ltd.) was used as a rubber material. TEJ2742 is a two-part product including an agent A (Base) and an agent B (curing agent). The agent A and the agent B, and MWNT (CM250, available from Hanwha Nanotech) were weighed as 39.4 wt %, 39.4 wt %, and 21.2 wt %, respectively, and were then mixed together using a conventional mixer, and further uniformly using a three-roll mill, thereby preparing a resistance heating composition. This resistance heating composition was coated as a thin film having a uniform thickness on a flat PI substrate using a film applicator, and then cured at about 200° C., thereby preparing a heating composite.

EVALUATION EXAMPLE 1

Measurement of Electric Conductivity of a Heating Composite

To measure electric conductivities of the heating composites prepared in Examples 1-3 and Comparative Examples 1-2, a conductive silver paste was applied along parallel opposite ends of each heating composite film prepared in Examples 1-3 and Comparative Examples 1-2, dried, and then cured in a 100° C. oven to prepare electrodes. An electric conductivity in siemens per meter (S/m) of each electrode was calculated from an electric resistance value and the size of the corresponding heating composite film was calculated based on the following equations. Details about the electric conductivity measurement were in accordance with an international standard IEC Standard 93 (VDE 0303, Part 30) or ASTM D 257.

Resistivity: $\rho = R \cdot d \cdot a/b$ [$\Omega$m]

Sheet resistance (a=b): $R_{sq}$ [$\Omega_{sq}$]

$\Rightarrow \rho = R_{sq} \cdot d$ [$\Omega$m]

Conductivity: $\tau = 1/\rho$ [S/m]

wherein a indicates a length of the electrode [m], b indicates a distance between electrodes [m], d indicates a film thickness [m], wherein d<<a, b, and R indicates resistance in Ohm.

The electric conductivities of the heating composites of Examples 1-3 and Comparative Examples 1-2 are presented in Table 1 below.

TABLE 1

|  | Electric conductivity (S/m) |
| --- | --- |
| Example 1 | 1861.3 |
| Example 2 | 1427.9 |
| Example 3 | 470.7 |
| Comparative Example 1 | 723.6 |
| Comparative Example 2 | 1289.6 |

Referring to Table 1 above, the heating composites of Examples 1-3 were found to have higher electric conductivities for a given amount of CNT as compared with those of Comparative Examples 1 and 2.

As described above, according to an embodiment, a resistance heating composite may be prepared by spraying a resistance heating composition with a low viscosity. The resistance heating composite may use an elastic support, and thus, may have good restoration property against deformation by external stress without a change in electric conductivity. The resistance heating composition uses an aqueous medium, and thus, is environmentally friendly. The resistance heating composite may be used in the form of a sheet heating composite in a heating apparatus for fusing apparatuses.

While this invention has been described in connection with what is presently considered to be practical exemplary embodiments, it should be understood that the invention is not limited to the disclosed embodiments but on the contrary, is intended to cover various modifications and equivalent arrangements included within the spirit and scope of the appended claims. Descriptions of features or aspects within each embodiment should be considered as available for other similar features or aspects in another embodiment.

What is claimed is:

1. A resistance heating composition comprising:
a silicone emulsion particle,
a carbon nanotube, and
an aqueous medium,
wherein the resistance heating composition is for a heating composite, at least one of the silicone emulsion particle and the carbon nanotube includes a charged surface, and the carbon nanotube is surface-treated to have a charge opposite to a charge of the silicone emulsion particle.

2. The resistance heating composition of claim 1, wherein the silicone emulsion particle is surface-treated with a silicone emulsifying surfactant comprising a cationic surfactant, an anionic surfactant, a nonionic surfactant, an amphoteric surfactant, or a combination thereof.

3. The resistance heating composition of claim 2, wherein the silicone emulsion particle is surface-treated with the anionic surfactant comprising an alkyl sulfate, an acrylate, a C10-C30 alkyl acrylate crosspolymer, a (C6-C20 alkyl) benzenesulfonic acid or a salt thereof, a sulfate ester of monoalkyl polyoxyethylene ether, a sulfonated glyceryl ester of a fatty acid, a salt of a sulfonated monovalent alcohol ester, an amide of an amino sulfonic acid, a sulfonated product of a fatty acid nitrile, a condensate of naphthalene sulfonic acid and formaldehyde, an alkali metal alkyl sulfate, an alkali metal ester sulfate, alkyl phosphate, sarcosinate, sulfonated olefin, or a combination thereof.

4. The resistance heating composition of claim 1, wherein the silicone emulsion particle has an average particle diameter of about 0.01 to about 10 micrometers.

5. The resistance heating composition of claim 1, wherein the carbon nanotube is surface-treated with a surfactant for dispersing carbon nanotubes comprising a cationic surfactant, an anionic surfactant, a nonionic surfactant, an amphoteric surfactant, or a combination thereof.

6. The resistance heating composition of claim 1, wherein the carbon nanotube is surface-treated with a surfactant for dispersing carbon nanotubes, then with a polyelectrolyte having an opposite charge to the surfactant for dispersing carbon nanotubes.

7. The resistance heating composition of claim 6, wherein the surfactant for dispersing carbon nanotubes is an anionic surfactant, and the polyelectrolyte is a cationic polyelectrolyte.

8. The resistance heating composition of claim 7, wherein the anionic surfactant for dispersing carbon nanotubes comprises a sodium dodecyl sulfate, alkylbenzene sulfonate, α olefin sulfonate, paraffin sulfonate, alkyl ester sulfonate, alkyl sulfate, alkyl alkoxy sulfate, alkyl sulfonate, ether sulfate, alkyl alkoxy carboxylate, alkyl alkoxylated sulfate, monoalkyl(ether) phosphate, dialkyl(ether) phosphate, sarcosinate, sulfosuccinate, isethionate, taurate, ammonium lauryl sulfate, ammonium laureth sulfate, triethylamine lauryl sulfate, triethylamine laureth sulfate, triethanolamine lauryl sulfate, triethanolamine laureth sulfate, monoethanolamine lauryl sulfate, monoethanolamine laureth sulfate, diethanolamine lauryl sulfate, diethanolamine laureth sulfate, lauric acid monoglyceride sodium sulfate, sodium lauryl sulfate, sodium laureth sulfate, potassium lauryl sulfate, potassium laureth sulfate, sodium lauryl phosphate, sodium tridecyl phosphate, sodium behenyl phosphate, sodium laureth-2 phosphate, sodium ceteth-3 phosphate, sodium trideceth-4 phosphate, sodium dilauryl phosphate, sodium ditridecyl phosphate, sodium ditrideceth-6 phosphate, sodium lauroyl sarcosinate, lauroyl sarcosine, cocoyl sarcosine, ammonium cosyl sulfate, sodium cosyl sulfate, sodium trideceth sulfate, sodium tridecyl sulfate, ammonium trideceth sulfate, ammonium tridecyl sulfate, sodium cocoyl isethionate, disodium laurate sulfosuccinate, sodium methyl oleoyl taurate, sodium laurate carboxylate, sodium trideceth carboxylate, sodium lauryl sulfate, potassium cosyl sulfate, potassium lauryl sulfate, monoethanolamine cosyl sulfate, sodium tridecyl benzene sulfonate, ether sulfonate, sodium dodecyl benzene sulfonate, sodium dodecyl sulfate, or a combination thereof.

9. The resistance heating composition of claim 7, wherein the cationic polyelectrolyte comprises a polyallylamine hydrochloride ("PAH"), polyethylenimine ("PEI"), polydialyldimethylammonium chloride, polymethacryloxyethyltrialkylammonium halide, polyarylamine chloride, polyacrylamide, aminoethylated polyacrylamide, polyvinylamine, Hofmann-degradated poly(meth)acrylamide, polyethyleneamine, cationized starch, chitosan, or a combination thereof.

10. The resistance heating composition of claim 1, wherein the silicone emulsion particle and the carbon nanotube are in a weight ratio of about 100:0.1 to about 100:100.

11. The resistance heating composition of claim 1, wherein the aqueous medium is water, or a combination of water and an organic solvent which is miscible with water at room temperature.

12. The resistance heating composition of claim 1, wherein an amount of the aqueous medium is about 5 to about 50,000 parts by weight based on 100 parts by weight of the silicone emulsion particle.

13. A heating composite comprising a cured product of the resistance heating composition of claim 1.

14. The heating composite of claim 13, wherein the heating composite is in the form of a sheet.

15. The heating composite of claim 13, wherein the carbon nanotube is bound to an exterior surface of the silicone emulsion particle.

16. The heating composite of claim 13, wherein the carbon nanotube is wrapped around an exterior surface of the silicone emulsion particle.

17. A method of preparing a heating composite, the method comprising:
   preparing the resistance heating composition of claim 1;
   disposing the resistance heating composition on a substrate; and
   thermally treating the resistance heating composition disposed on the substrate to provide the heating composite.

18. The method of claim 17, wherein the preparing of the resistance heating composition comprises mixing a silicone emulsion and an aqueous dispersion solution comprising carbon nanotubes.

19. The method of claim 17, wherein the resistance heating composition is disposed on the substrate by spraying.

20. The method of claim 17, wherein the resistance heating composition is disposed on the substrate by spraying at a spray speed of about 0.1 milliliters per minute to about 500 milliliters per minute.

21. The method of claim 17, wherein the resistance heating composition is disposed on the substrate by spraying at a spray distance, the distance between the resistance heating composition and the substrate, from about 0.01 meters to about 1 meters.

22. The method of claim 17, wherein the thermal treating comprises contacting the substrate with a heat source.

23. The method of claim 17, wherein the thermal treating is performed at a temperature of about room temperature to about 250° C.

24. A heating apparatus for a fusing apparatus, comprising:
   a heating composite layer comprising a cured product of the resistance heating composition of claim 1; and
   an electrode for supplying electricity to the heating composite layer disposed in contact with the heating composite layer.

25. The heating apparatus of claim 24, further comprising a support for supporting the heating composite layer, wherein the heating composite layer is disposed on the support.

26. The heating apparatus of claim 24, further comprising a releasing layer disposed on an outer surface of the heating composite layer.

27. A fusing apparatus for a printing apparatus, comprising:
   the heating apparatus of claim 24; and
   a pressure member disposed opposite to the heating apparatus.

28. The fusing apparatus of claim 27, wherein the printing apparatus is a laser printer.

* * * * *